United States Patent
Yu et al.

(10) Patent No.: US 10,104,286 B1
(45) Date of Patent: Oct. 16, 2018

(54) MOTION DE-BLURRING FOR PANORAMIC FRAMES

(71) Applicant: Amazon Technologies, Inc., Seattle, WA (US)

(72) Inventors: Tsz Ho Yu, Sunnyvale, CA (US); Paul Aksenti Savastinuk, Shoreline, WA (US); Yinfei Yang, Bellevue, WA (US); Cheng-Hao Kuo, Seattle, WA (US); Ross David Roessler, Seattle, WA (US); William Evan Welbourne, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 446 days.

(21) Appl. No.: 14/837,793

(22) Filed: Aug. 27, 2015

(51) Int. Cl.
*H04N 5/232* (2006.01)
*G06K 9/46* (2006.01)
*G06T 7/20* (2017.01)

(52) U.S. Cl.
CPC ........... *H04N 5/23238* (2013.01); *G06K 9/46* (2013.01); *G06K 9/4604* (2013.01); *G06T 7/20* (2013.01); *G06K 2009/4666* (2013.01)

(58) Field of Classification Search
CPC .................................................. H04N 5/23238
See application file for complete search history.

(56) References Cited

U.S. PATENT DOCUMENTS

| | | | |
|---|---|---|---|
| 6,192,393 B1 | 2/2001 | Tarantino et al. | |
| 6,788,333 B1 | 9/2004 | Uyttendaele et al. | |
| 2002/0021353 A1 | 2/2002 | DeNies | |
| 2002/0049979 A1 | 4/2002 | White et al. | |
| 2004/0030527 A1 | 2/2004 | Rankin | |
| 2004/0032495 A1 | 2/2004 | Ortiz | |
| 2005/0002535 A1 | 1/2005 | Liu et al. | |
| 2005/0280701 A1 | 12/2005 | Wardell | |
| 2007/0035612 A1 | 2/2007 | Korneluk et al. | |
| 2009/0284601 A1 | 11/2009 | Eledath et al. | |
| 2010/0034425 A1 | 2/2010 | Lin et al. | |
| 2010/0050221 A1 | 2/2010 | McCutchen et al. | |
| 2010/0299630 A1 | 11/2010 | McCutchen et al. | |
| 2011/0214072 A1 | 9/2011 | Lindemann et al. | |

(Continued)

OTHER PUBLICATIONS

Lee, "Image Deblurring by Using the Estimation of PSF Parameters for Image Devices," IEEE, 2010 Digest of Technical Papers International Conference on Consumer Electronics, 2 pages, Available at: http://ieeexlpore.ieee.org/xpls/abs_all.jsp?arnumber=5418797&tag=1, (Jan. 2010).

(Continued)

*Primary Examiner* — Tung Vo
*Assistant Examiner* — Rowina Cattungal
(74) *Attorney, Agent, or Firm* — K&L Gates LLP

(57) ABSTRACT

Systems and methods may be directed to de-blurring panoramic images and/or video. An image processor may receive a frame, where the frame comprises a plurality of pixel values arranged in a grid. The image processor may divide the frame into a first section and a second section. The image processor may determine a first motion kernel for the first section and apply the first motion kernel to the first section. The image processor may also determine a second motion kernel for the second section and apply the second motion kernel to the second section.

18 Claims, 14 Drawing Sheets

(56) References Cited

U.S. PATENT DOCUMENTS

| | | |
|---|---|---|
| 2012/0057852 A1 | 3/2012 | Devleeschouwer et al. |
| 2012/0210252 A1 | 8/2012 | Fedoseyeva et al. |
| 2013/0070047 A1 | 3/2013 | DiGiovanni et al. |
| 2014/0059166 A1 | 2/2014 | Mann et al. |
| 2014/0340427 A1* | 11/2014 | Baker .................. G06T 3/0062 345/641 |
| 2015/0110404 A1* | 4/2015 | Cho ....................... G06T 5/003 382/195 |
| 2015/0116547 A1* | 4/2015 | Laroia .................. G02B 13/009 348/240.1 |
| 2016/0019713 A1* | 1/2016 | Dillard .................. G06T 15/503 345/419 |
| 2016/0191802 A1* | 6/2016 | Martinello ......... H04N 5/23267 348/208.4 |

OTHER PUBLICATIONS

Smith, "Linear Image Processing," The Scientist and Engineer's Guide to Digital Signal Processing, Chapter 24, pp. 397-422, Available at: http://www.dspguide.com/ch24.htm, (1997).

* cited by examiner

MOTION DE-BLURRING FOR PANORAMIC FRAMES

BACKGROUND

When a video is captured with a moving camera, features in the camera's field-of-view that are not moving at the same velocity as the camera appear blurred in the video. For example, when a video is taken from a moving car, stationary roadside objects such as signs, buildings, etc., will appear smudged in the video. Known techniques, however, are not optimal for panoramic videos.

DETAILED DESCRIPTION

Figure 1:
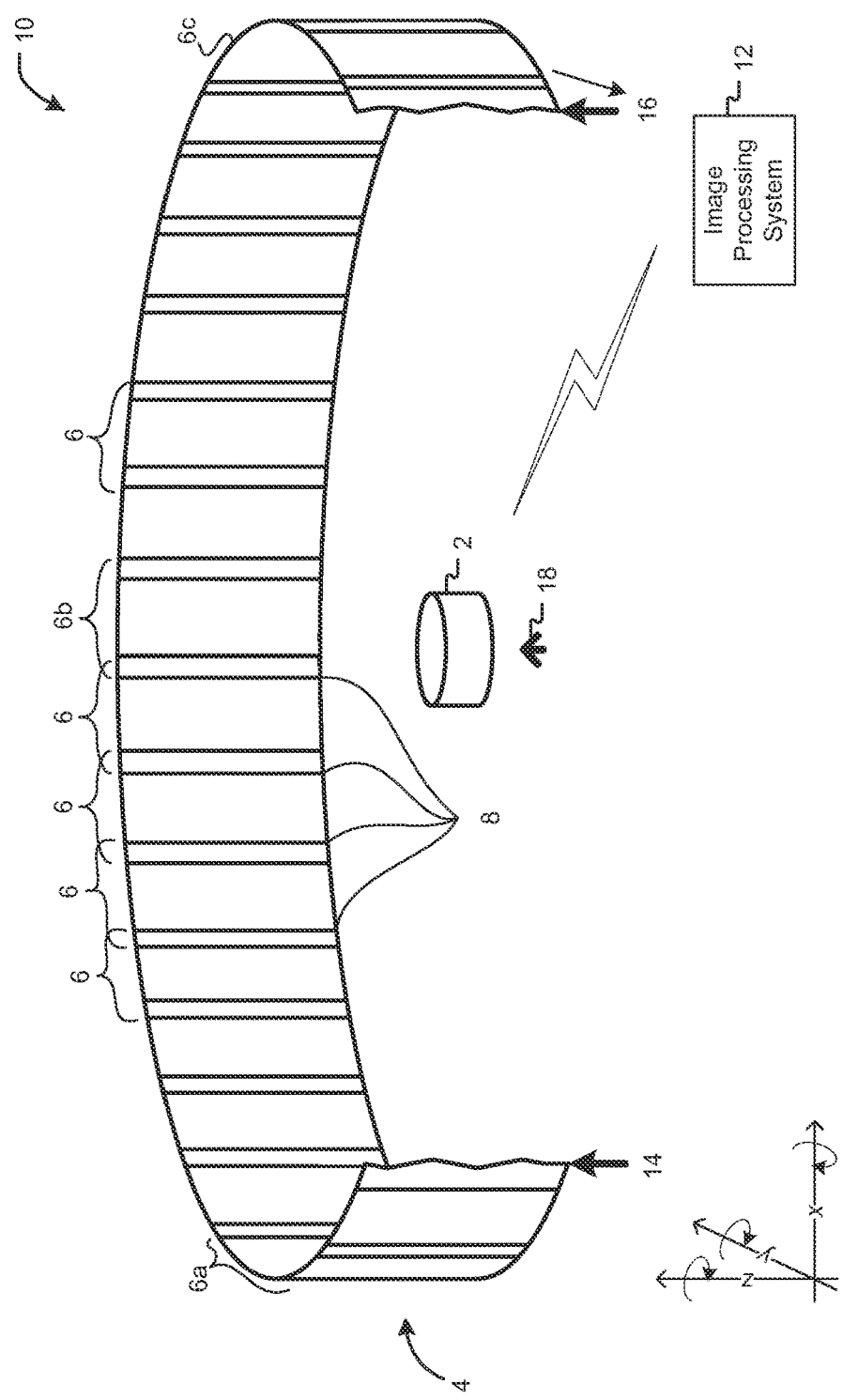
FIG. 1 is a diagram showing one example of an environment including a panoramic camera and a partial panoramic frame captured by the panoramic camera.

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for de-blurring panoramic videos or images. Panoramic videos include a number of panoramic frames or frames to be displayed consecutively during playback. Each frame may include a set of pixel values representing a scene captured by the panoramic camera system. Each pixel value of a frame may be described by a unique position on a two-dimensional grid. The position of a pixel value on the two-dimensional grid may correspond to the spatial position of a portion of the depicted scene represented by the pixel value. In some examples, each pixel value corresponds to the output from one pixel element of an image sensor of the panoramic camera system. For example, when the panoramic camera system includes a single image sensor, a pixel value may represent the output of one pixel element from the image sensor. In other examples, pixel values may not directly correspond to the output of a single pixel element. For example, when the panoramic camera system includes multiple image sensors, some pixel elements may represent a combination of outputs from pixel elements from different (e.g., adjacent) image sensors. Also, for example, when the panoramic frame is subject to various processing, such as compression, resolution modification, etc., pixel values may not directly correspond to the output of a single pixel element from an image sensor.

A panoramic image may include single frame, sometimes referred to herein as a still frame. When a panoramic camera is moving, the motion of the camera is in different directions relative to different portions of the scene captured by the camera. Because of this, the motion of the camera may be expressed differently in different portions of the panoramic frame. For example, a panoramic frame captured from inside a moving car may show the view out the windshield, the driver side window and the passenger side window. When the car is moving forward, the motion of the camera relative to the portions of the frame showing the windshield is towards the frame. The motion of the camera relative to the portions of the frame showing the driver side window, however, is from left to right. Relative to portions of the frame showing the passenger side window, the motion of the camera is from right to left. Because the motion of the camera is expressed differently at different parts of a frame, blurring artifacts may also be directed differently at different parts of a frame. For example, a point spread function at a portion of a frame where camera motion is expressed from left-to-right camera motion may be different than a point spread function at a portion of where camera motion is expressed from right-to-left. In various examples, an image processor may de-blur a panoramic frame by dividing the frame into sections and applying direction-specific de-blurring to each section. For example, the image processor may apply a direction-specific motion kernel to each section.

FIG. 1 is a diagram showing one example of an environment 10 including a panoramic camera 2 and a partial panoramic frame 4 captured by the panoramic camera 2. The panoramic frame 4 is divided into a plurality of sections 6.

Each section 6 comprises a set of pixel values selected from the panoramic frame 4. In some examples, including the example shown in FIG. 1, sections 6 are positioned such that adjacent sections 6 partially overlap one another, creating overlap regions 8 in the frame 4.

The panoramic camera 2 may be any camera or camera system for capturing panoramic frames, which may be used as still frames or may be incorporated into a panoramic video. The panoramic camera 2 may comprise a single image sensor with lenses, mirrors or other optics that project a panoramic field-of-view on the single image sensor. In some examples, the panoramic camera 2 comprises multiple image sensors. In some examples, image sensors may comprise a plurality of pixel sensors (not shown) that are sensitive to incoming light. Pixel values may be or be derived from readings taken from the pixel sensors. The panoramic camera 2 and/or another component may stitch the outputs from the multiple image sensors into a single panoramic image and/or video. The panoramic camera 2 may have a field-of-view larger than that of a standard camera. For example, the panoramic camera 2 may have a field-of-view of about 180° or greater. Some panoramic cameras 2 may have fields-of-view as large as 360° and/or 4π steradians. In the context of a camera or other image-capturing device, field-of-view describes the portion of a scene that is reproduced in the frame. For example, the field-of-view of a frame may be equal to the field-of-view of the camera or other image capturing device that captured the frame.

The panoramic frame 4, as shown in FIG. 1, is truncated at points 14 and 16 so that the panoramic camera 2 is visible. The field-of-view of the panoramic frame 4 may extend further around the panoramic camera 2 and, in some examples, may extend a full 360°. After capture, the panoramic frame 4 may be provided to an image processor 12 that is directly or indirectly in communication with the panoramic camera 2. The image processor 12 may perform de-blurring and, in some examples, additional image processing. The image processor 12 may be an integral component of the panoramic camera 2 and/or may be implemented by a separate system, for example, as described in more detail with respect to FIG. 3.

Because the frame 4 has a panoramic field-of-view, different sections 6 may display motion blurring in different directions. For example, the motion of the panoramic camera 2 may be expressed in different directions at each of the sections 6 (including sections 6a, 6b, 6c described below). This may cause the point spread function describing the blurring at each section 6 to be different. The point spread function of a frame or portion of a frame may describe the difference between a clear or un-blurred area and an area blurred by camera motion artifacts.

Figure 2:
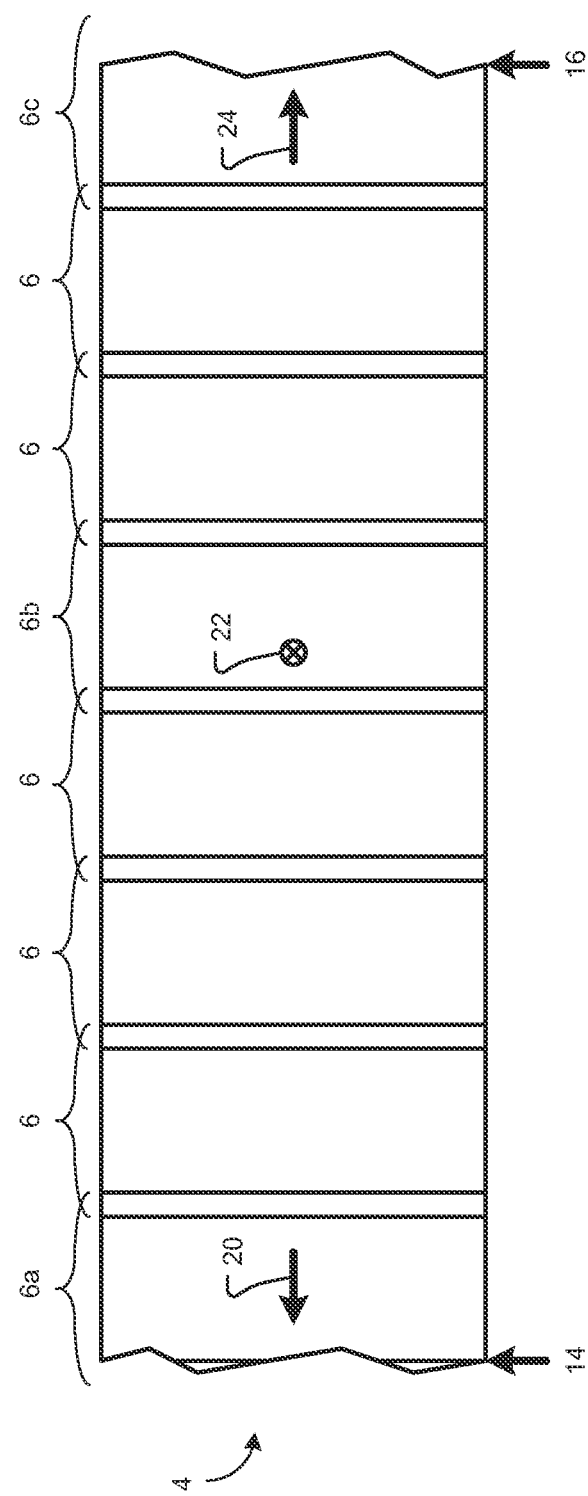
FIG. 2 is a diagram showing a flattened example of the frame of FIG. 1.

FIGS. 1 and 2 illustrate the differences in camera motion expressed at the different sections 6 of the panoramic frame 4. FIG. 2 is a diagram showing a flattened example of the panoramic frame 4. In the example of FIG. 1, the panoramic camera 2 is moving in a direction indicated by the arrow 18. For example, FIGS. 1 and 2 both show an example section 6a positioned to the left of the panoramic camera 2 in the orientation of FIG. 1; an example section 6b positioned in front of the panoramic camera 2 in the orientation of FIG. 1; and an example section 6c positioned to the right of the panoramic camera 2 in the orientation of FIG. 1. When the panoramic camera 2 is moving in the direction shown by arrow 18 of FIG. 1, that motion may be expressed from right-to-left in section 6a, as shown by arrow 20 in FIG. 2. The camera motion indicated by arrow 18 may be expressed at section 6b into the page in FIG. 2, as indicated by the arrow 22. The camera motion indicated by arrow 18 may be expressed at section 6c from left-to-right, as indicated by arrow 24 in FIG. 2.

Upon receiving the frame 4, the image processor 12 may divide the frames into sections 6 in any suitable manner. The image processor 12 may find a motion kernel for each section 6 or group of similar sections 6. A motion kernel may be an operator applied to pixel values in a section to de-blur the pixel values or to remove blurring artifacts due to motion of the panoramic camera 2. In some examples, a motion kernel for a section 6 may be an estimation of the point spread function at the relevant section. The motion kernel for a section 6 may be any suitable operator. An example motion kernel is shown below:

Example Motion Kernel $$\begin{bmatrix} a & b & c \\ d & e & f \\ g & h & i \end{bmatrix}$$

Although a 3×3 motion kernel is shown, any suitable type or size of kernel may be used. Each of the values a, b, c, d, e, f g, h, i in the motion kernel may represent pixel multipliers that are utilized when the kernel is applied to a frame section 6. In some examples, the values a, b, c, d, e, f g, h, i are integers, where each integer may be positive or negative. In some examples, a motion kernel may be applied to a frame 4 or frame section 6 by convolving the matrix making up the motion kernel with the frame 4 or section 6. To de-blur a frame 4, the image processor 12 may apply, to each section 6, the kernel corresponding to that section.

In examples where the sections 6 of the frame 4 partially overlap, the image processor 12 may de-blur the overlap regions 8 in any suitable manner. In some examples, the image processor 12 may blend the motion kernels for overlapping sections 6 in the overlap regions 8. For example, the image processor 12 may take an average or other aggregation of all of the motion kernels of overlapping sections 6 and apply that aggregated motion kernel to the overlap region 8. In some examples, the image processor 12 may apply motion kernels of each overlapping section 6 to an overlap region 8 and then average or otherwise aggregate the resulting pixel values.

In various examples, the image processor 12 may perform additional processing on the frame 4. In some examples, the image processor 12 may stitch the frame 4 from individual image sensor frames. For example, the panoramic camera 2 may comprise multiple image sensors with partially overlapping fields-of-view. The image processor 12 may receive multiple image sensor frames (e.g., one from each image sensor in the panoramic camera 2). The image processor 12 may stitch the image sensor frames into a single panoramic frame. Stitching may occur before or after de-blurring. For example, when de-blurring is applied before stitching, the image processor 12 may find a motion kernel for each image sensor frame.

Figure 3:
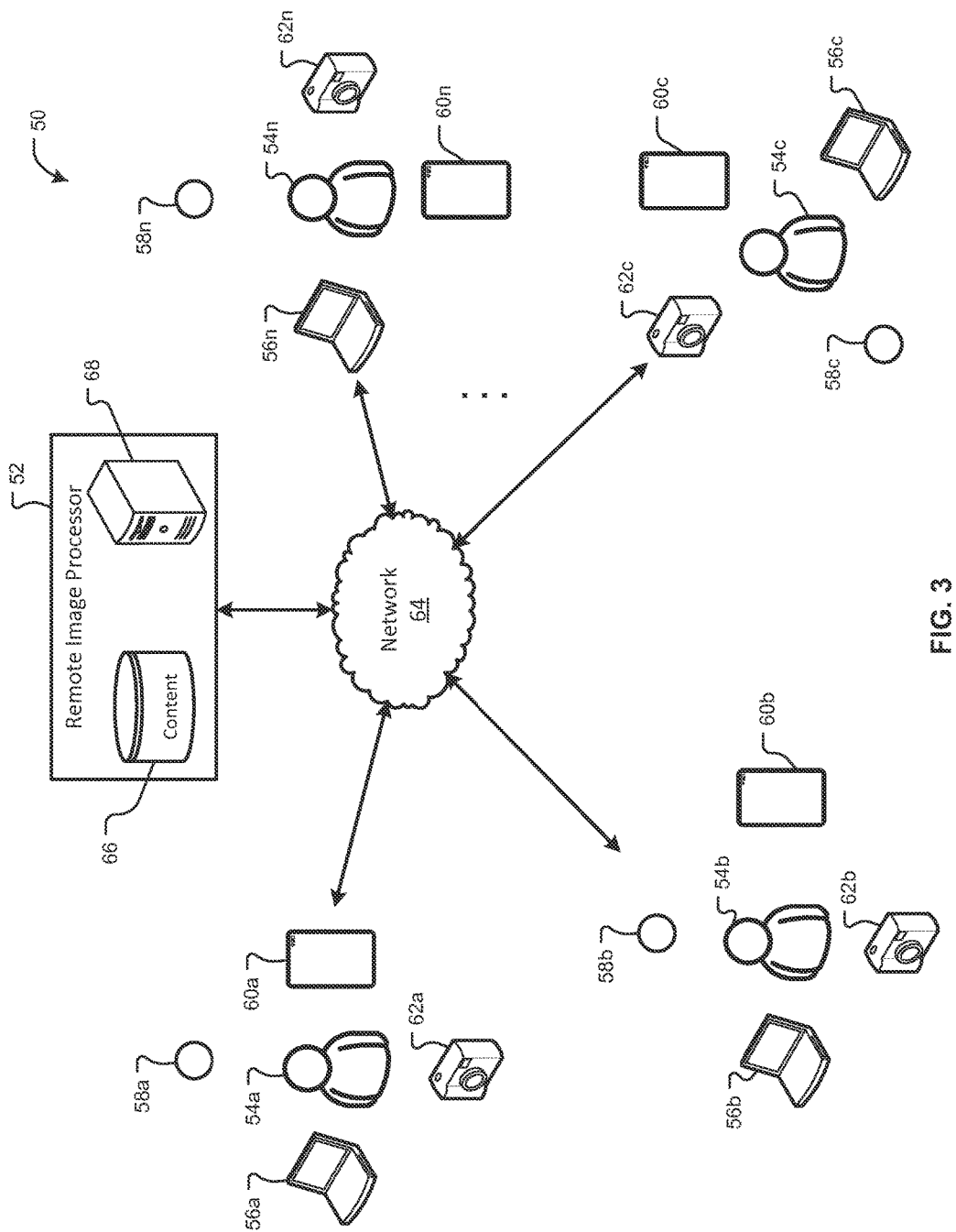
FIG. 3 is a diagram showing one example of an environment for de-blurring frames.

FIG. 3 is a diagram showing one example of an environment 50 for de-blurring frames. The environment 50 comprises a remote image processor 52 and users 54a, 54b, 54c, 54n. Each user 54a, 54b, 54c, 54n may use one or more user devices such as, for example, panoramic camera systems 58a, 58b, 58c, 58n, digital cameras 62a, 62b, 62c, 62n, mobile devices 60a, 60b, 60c, 60n, or other computing devices 56a, 56b, 56c, 56n. Although four users 54a, 54b, 54c, 54n are shown, any suitable number of users 54a, 54b, 54c, 54n may be part of the environment. Also, although each user 54a, 54b, 54c, 54n shown in FIG. 3 is associated with a panoramic camera system 58a, 58b, 58c, 58n, a mobile device 60a, 60b, 60c, 60n, a digital camera 62a, 62b, 62c, 62n and a computing device 56a, 56b, 56c, 56n, some users 54a, 54b, 54c, 54n may use additional user devices and/or fewer user devices than what is shown.

User devices may be utilized to capture images and/or videos, transmit images and/or videos to the remote image processor 52, and/or perform de-blurring as described herein. Panoramic camera systems 58a, 58b, 58c, 58n may include one or more image sensors and associated optics to capture panoramic images and/or panoramic videos. Panoramic camera systems 58a, 58b, 58c, 58n may have a panoramic field-of-view, as described herein. In some examples, a panoramic camera system 58a, 58b, 58c, 58n may comprise a single image sensor with lenses, mirrors or other optics allowing the single image sensor to receive electromagnetic radiation (e.g., light) from the panoramic field-of-view. In some examples, a panoramic camera system 58a, 58b, 58c, 58n may comprise multiple image sensors (e.g., with partially overlapping fields-of-view). The panoramic camera system 58a, 58b, 58c, 58n (or another component of the environment 50) may be configured to stitch frames from the respective image sensors into a single panoramic frame. In some examples, panoramic camera systems 58a, 58b, 58c, 58n may be configured to communicate with other components of the environment 50 utilizing, for example, a wired or wireless connection. For example, a panoramic camera system 58a, 58b, 58c, 58n may upload a frame or frames to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a panoramic camera system 58a, 58b, 58c, 58n may be configured to upload images and/or video directly to a remote image processor 52, for example, via the network 64. Also, in some examples, a panoramic camera system 58a, 58b, 58c, 58n may comprise a processor and/or other components to implement an image processor (e.g., for de-blurring, as described herein).

Digital cameras 62a, 62b, 62c, 62n may comprise any suitable device with one or more image sensors to capture an image and/or video. In some examples, digital cameras 62a, 62b, 62c, 62n may be configured to communicate with other components of the environment 50 utilizing, for example, a wired or wireless connection. For example, a digital camera 62a, 62b, 62c, 62n may upload images and/or videos to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a digital camera 62a, 62b, 62c, 62n may be configured to upload images and/or video directly to a remote image processor 52, for example, via the network 64. Also, in some examples, a digital camera 62a, 62b, 62c, 62n may comprise a processor and/or other components to implement de-blurring, as described herein. Digital cameras 62a, 62b, 62c, 62n may have a standard or panoramic field-of-view. For example, de-blurring, as described herein, may be performed on frames having a standard or panoramic field-of-view.

A mobile device 60a, 60b, 60c, 60n may be any suitable type of computing device comprising a processor and data storage. In some examples, a mobile device 60a, 60b, 60c, 60n may be configured to receive frames captured by a panoramic camera system 58a, 58b, 58c, 58n or digital camera 62a, 62b, 62c, 62n and transfer the frames for de-blurring at the remote image processor 52. In some examples, a mobile device 60a, 60b, 60c, 60n to execute an image processor for de-blurring frames received, for example, from a panoramic camera system 58a, 58b, 58c, 58n or digital camera 62a, 62b, 62c, 62n. Also, in some examples, a mobile device 60a, 60b, 60c, 60n may comprise one or more image sensors and associated optics for capturing images and/or video and either uploading the resulting frames to the remote image processor 52 or performing executing an image processor. In some examples, a mobile device 60a, 60b, 60c, 60n may be configured to communicate on a cellular or other telephone network.

A computing device 56a, 56b, 56c, 56n may be any suitable type of computing device comprising a processor and data storage including, for example, a laptop computer, a desktop computer, etc. In some examples, a computing device 56a, 56b, 56c, 56n may be configured to receive frames captured by a panoramic camera system 58a, 58b, 58c, 58n or digital camera 62a, 62b, 62c, 62n and transfer the images and/or video for de-blurring at the remote image processor 52. In some examples, a computing device 56a, 56b, 56c, 56n may be configured to execute an image processor for de-blurring frames received, for example, from a panoramic camera system 58a, 58b, 58c, 58n or digital camera 62a, 62b, 62c, 62n. Also, in some examples, a computing device 56a, 56b, 56c, 56n may comprise one or more image sensors and associated optics for capturing images and/or video and either uploading the resulting frames to the remote image processor 52 or performing executing an image processor.

The optional remote image processor 52 may perform de-blurring on images and/or videos received from users 54a, 54b, 54c, 54n (e.g., user devices associated with the user), as described herein. The remote image processor 52 may comprise one or more data stores 66 and one or more servers 68. The data store 66 may store videos and/or images received from the various user devices, motion kernels, and/or other data associated with de-blurring. The various components 68, 66 of the remote image processor 52 may be at a common geographic location and/or may be distributed across multiple geographic locations. For example, the remote image processor 52 may be implemented in whole or in part as a cloud or Softare as a Service (SaaS) system. In some examples, the remote image processor 52 may perform de-blurring on images or videos received from multiple different users 54a, 54b, 54c, 54n (e.g., via their associated cameras, computing devices, or other devices). The various components of the environment 50 may be in communication with one another via a network 64. The network 64 may be and/or comprise any suitable wired or wireless network configured according to any suitable architecture or protocol. In some examples, the network 64 may comprise the Internet.

Figure 4:
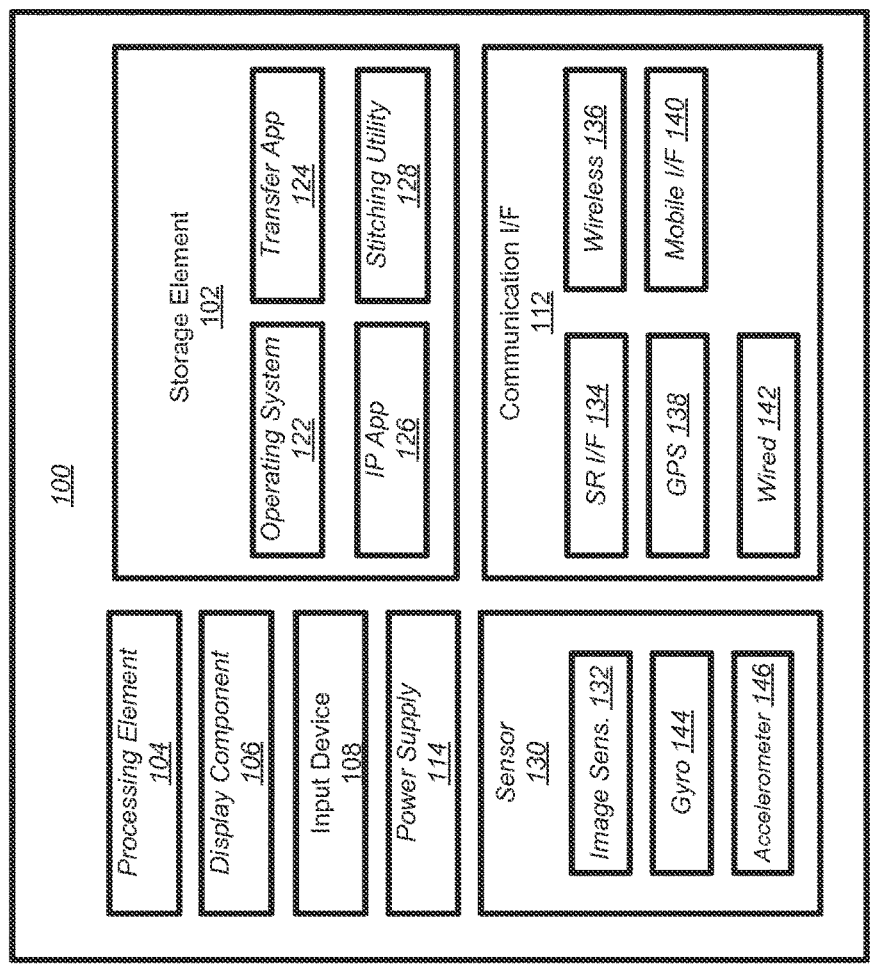
FIG. 4 is a block diagram showing an example architecture of a user device, such as the panoramic cameras, digital cameras, mobile devices and other computing devices described herein.

FIG. 4 is a block diagram showing an example architecture 100 of a user device, such as the panoramic cameras, digital cameras, mobile devices and other computing devices described herein. It will be appreciated that not all user devices will include all of the components of the architecture 100 and some user devices may include additional components not shown in the architecture 100. The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs). The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104. An operating system 122 may provide the user with an interface for operating the user device and may facilitate communications and commands between applications executing on the architecture 100 and various hardware thereof. A transfer application 124 may be configured to receive images and/or video from another device (e.g., a panoramic camera system or digital camera) or from an image sensor 132 included in the architecture 100. In some examples, the transfer application 124 may also be configured to upload the received images and/or videos to another device that may perform de-blurring as described herein (e.g., a mobile device, another computing device, or a remote image processor 52). In some examples, a image processor application 126 may perform de-blurring on videos and/or images received from an image sensor of the architecture 100 and/or from another device. The image processor application 126 may be included, for example, at a panoramic camera system, a digital camera, a mobile device or another computer system. In some examples, where de-blurring is performed by a remote image processor or another component of the environment 50, the image processor application 126 may be omitted. A stitching utility 128 may stitch images and/or videos received from multiple image sensors into a single image and/or video. The stitching utility 128 may be included, for example, in a panoramic camera system and/or a mobile device or other computing device receiving input from a panoramic camera system.

When implemented in some user devices, the architecture 100 may also comprise a display component 106. The display component 106 may comprise one or more light emitting diodes (LEDs) or other suitable display lamps. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The architecture 100 may also include a communication interface 112, comprising one or more wired or wireless components operable to communicate with one or more other user devices and/or with the remote image processor 52. For example, the communication interface 112 may comprise a wireless communication module 136 configured to communicate on a network, such as the network 64, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth™, Bluetooth LE™, etc. A mobile interface 140 may be configured to communicate utilizing a cellular or other mobile protocol. A Global Positioning System (GPS) interface 138 may be in communication with one or more earth-orbiting satellites or other suitable position-determining systems to identify a position of the architecture 100. A wired communication module 142 may be configured to communicate according to the Universal Serial Bus (USB) protocol or any other suitable protocol.

The architecture 100 may also include one or more sensors 130 such as, for example, one or more image sensors and one or more motion sensors. An image sensor 132 is shown in FIG. 4. Some examples of the architecture 100 may include multiple image sensors 132. For example, a panoramic camera system may comprise multiple image sensors 132 resulting in multiple images and/or video frames that may be stitched to form a panoramic output. Motion sensors may include any sensors that sense motion of the architecture including, for example, gyroscope sensors 144 and accelerometers 146. Motion sensors, in some examples, may be included in user devices such as panoramic cameras, digital cameras, mobile devices, etc., that capture video or images for de-blurring. The gyroscope sensor 144 may be configured to generate a signal indicating rotational motion and/or changes in orientation of the architecture (e.g., a magnitude and/or direction of the motion or change in orientation). Any suitable gyroscope sensor may be used including, for example, ring laser gyros, fiber-optic gyros, fluid gyros, vibration gyros, etc. The accelerometer 146 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 138 may be utilized as a motion sensor. For example, changes in the position of the architecture 100, as determined by the GPS interface 138, may indicate the motion of the GPS interface 138.

Figure 5:
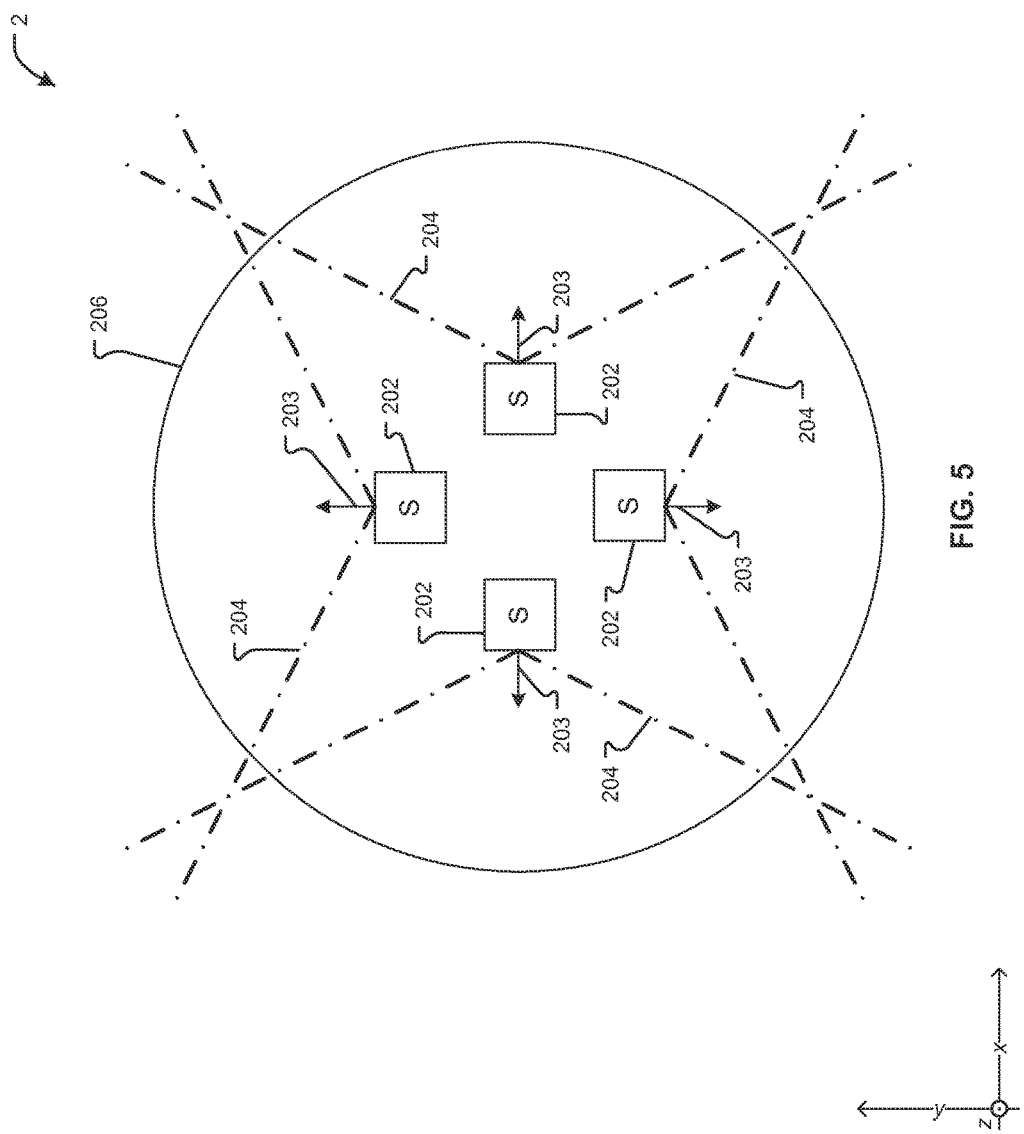
FIG. 5 is a diagram showing a cross-sectional view of one example of the panoramic camera comprising four image sensors.

FIG. 5 is a diagram showing a cross-sectional view of one example of the panoramic camera 2 comprising four image sensors 202 having a common position in a plane of the x and y axes of the coordinate set illustrated in FIGS. 1 and 5. The image sensors 202 may be mounted in a mounting assembly 206 in any suitable manner. The image sensors 202 may be or include any suitable type of sensor including, for example, charge coupled devices. Image sensors 202 may also include lenses, mirrors or other suitable optics. Each image sensor 202 may have a field-of-view indicated by 204. The fields-of-view 204 may partially overlap, as indicated. Frames captured by the various image sensors 202 may be stitched into a panoramic frame. For example, collectively, the image sensors 202 may have a 360° field-of-view. Each image sensor may be directed in an image sensor direction 203. For example, respective image sensor directions 203 may be positioned in the middle of the respective fields-of-view 204 of the image sensors 202. In some examples, the panoramic camera 2 may comprise more or fewer image sensors either directed on the xy plane like the image sensors 202 or in another position. For example, the panoramic camera 2 may comprise one or more image sensors directed in the positive and/or negative z direction. The field-of-view of such an example of the panoramic camera 2 may be as much as 4π steradians.

Figure 6:
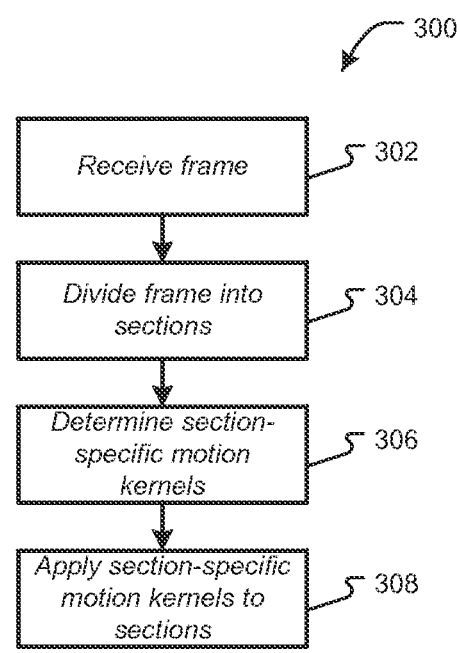
FIG. 6 is a flowchart showing one example of a process flow that may be executed by an image processor to de-blur a frame.

FIG. 6 is a flowchart showing one example of a process flow 300 that may be executed by an image processor to de-blur a frame, such as the example frame 4 shown in FIG. 1. At 302, the image processor may receive the frame 4. The frame 4 may be received in any suitable manner. In examples where the image processor is implemented by a panoramic camera 2, the frame 4 may be received from one or more image sensors and/or from a stitching utility 128 that has stitched the frame 4 from two or more image sensor frames. In examples where the image processor is implemented by a mobile device or other computing device, the frame 4 may be received from a panoramic camera, such as the panoramic camera 2, or digital camera. In examples where a remote image processor 52 is used, the frame 4 may be received from a panoramic camera, such as 2, a digital camera and/or from an intermediate mobile device or other computing device.

At 304, the image processor may divide the frame 4 into sections. The frame 4 may be divided into sections in any suitable manner. For example, the frame may be rectangular and divided into columnar-shaped sections 6, as illustrated in FIG. 1. Columnar-shaped sections or columns 6 may comprise pixel values having a range of X positions according to the two-dimensional grid. The range of X positions may be contiguous and may be less than all of the X positions of the two-dimensional grid. Although the frame 4 and sections 6 are rectangular, sections of any suitable shape may be found, however. Other suitable section shapes include, squares, pentagons, ovaloids, irregular shapes, etc. In some examples, the frame 4 may be divided into sections based on objects in a frame, as described in more detail with respect to FIGS. 14 and 15. In various examples, sections may partially overlap or not overlap. Any suitable number of sections may be created. In some examples utilizing panoramic cameras with multiple image sensors, the image processor may create one section for each image sensor, with each section corresponding roughly to the portion of the panoramic frame 4 captured by one of the image sensors. In some examples, the image processor may select the number and therefore the size of the sections considering the speed of the camera at the time that the frame was captured. For example, the image processor may select smaller sections when the camera is moving faster. In some examples, the image processor may try more than one division of the frame 4 into sections. The image processor may find quality metrics for de-blurring performed on different numbers and sizes of sections. The combination of section size and number having the highest quality metric values may be used.

At 306, the image processor may determine motion kernels for each section. In some examples, the motion kernels may be section-specific. For example, the motion kernel for a section may be determined based on a sensed motion of the camera and/or one or more motion metrics derived from the section. Examples where a motion kernel for a section is determined based on a sensed motion of the camera are described with respect to FIG. 7. Examples where a motion kernel for a section is determined based on one or more motion metrics derived from the section are described with respect to FIG. 8. In some examples, the image processor may find an estimated motion kernel and then refine the estimated motion kernel, for example, based on its performance in a section. Examples for refining an estimated motion kernel are described herein with respect to FIG. 9. At 308, the image processor may apply each motion kernel to its corresponding section. The way that the motion kernel is applied may depend on the type of motion kernel used. For example, when the motion kernel is a matrix, applying the motion kernel may comprise convolving the motion kernel with the section (e.g., the pixel values of the section). Overlap regions 8 may be de-blurred, for example, by aggregating the motion kernels of any sections that partially overlap at the overlap regions 8. The motion kernels may be aggregated in any suitable manner. For example, the kernels themselves may be aggregated to find an aggregated motion kernel for the overlap region 8, for example, by averaging the respective matrix components in each kernel. The aggregated motion kernel may then be applied to the overlap region. In some examples, the image processing kernel may find pixel values for the overlap region 8 using each of the motion kernels of the partially overlapping sections and then aggregate or average the results. Also, in some examples, the image processor may independently apply the motion kernels of the overlapping sections to an overlap region 8, resulting in a version of the overlap region 8 de-blurred by a first overlapping section motion kernel and a second version of the overlap region 8 de-blurred by a second overlapping section motion kernel. (If more than two sections overlap at the overlap region 8, additional versions of the overlap region 8 may also be found). The image processor may select from among the versions of the overlap region 8 the version with the best value or values for one or more quality metrics, as described herein.

Figure 7:
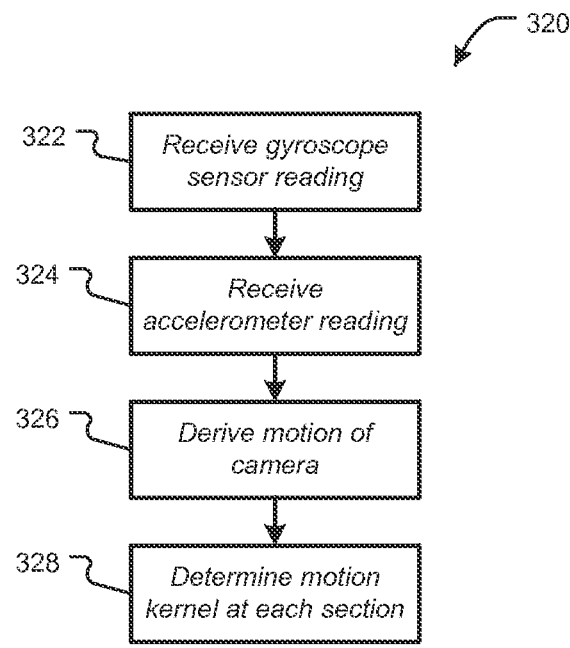
FIG. 7 is a flowchart showing one example of a process flow that may be executed by the image processor to determine a motion kernel based on a sensed motion of a camera.

FIG. 7 is a flowchart showing one example of a process flow 320 that may be executed by the image processor to determine a motion kernel based on a sensed motion of a camera 2. At 322 and 324, the image processor may receive motion sensor data. For example, at 322, the image processor may receive gyroscopic data indicating a rotation of the camera 2. The gyroscopic data may originate, for example, from a gyroscope sensor that is positioned at the camera 2, such as sensor 144. The gyroscopic data may be in any suitable format. In some examples, gyroscopic data may comprise an indication of rotation components about the x, y, and z axes (see FIGS. 1 and 5). Of course, other formats may be used as well. For example, when non-Cartesian coordinate systems are used, such a polar coordinate systems, spherical coordinate systems, cylindrical coordinate systems, etc. At 324, the image processor may receive accelerometer data indicating an acceleration of the camera 2. The accelerometer data may originate, for example, from an accelerometer that is positioned at the camera 2, such as the accelerometer 146. Accelerometer data may be in any suitable format. For example, accelerometer data may indicate an acceleration force in the x, y, and z directions, or according to another suitable coordinate system.

In various examples, the motion sensor data received by the image processor may depend on motion sensors present at the camera 2. For example, if the panoramic camera 2 lacks an accelerometer or a gyroscope sensor, data from the omitted sensor may not be received. Also, in some examples, the panoramic camera 2 may comprise an additional motion sensor or sensors, and the image processor may receive motion sensor data from the additional motion sensor or sensors. Also, in some examples, the camera 2 or other computing device in communication with motion sensors may be configured to change the format of motion sensor data. For example, the camera 2 or other computing device may be programmed to convert an accelerometer reading into an indication of the velocity of the camera 2. An indication of an acceleration of the camera 2 may be converted to a velocity of the camera 2, for example, by integrating the acceleration over time. Accordingly, instead of receiving a direct accelerometer reading at 324, the image processor may receive an indication of the velocity of the camera 2. For example, the camera 2 or other computing device may be programmed to remove from the accelerometer reading acceleration components due to gravity.

At 326, the image processor may derive a motion of the camera 2. When a Cartesian coordinate system is used, as illustrated in FIGS. 1 and 5, the motion of the camera may be expressed as a velocity and rotation value for each of the x, y, and z axes. The velocity or rotation value for any axis may be zero. The motion may be found, for example, by modifying and/or combining accelerometer and/or gyroscope sens readings received as described above. For example, the image processor may be programmed to track acceleration values for the camera 2 over time to determine the motion of the camera 2 (e.g., a magnitude and direction). Also, for example, the image processor may be programmed to subtract from accelerometer readings components due to gravity. In some examples, the motion and/or rotation of the camera 2 may be found by the camera 2 or other processing computing device and provided directly to the image processor.

At 328, the image processor may determine a motion kernel for each section in the frame 4. Motion kernels may be determined in any suitable manner. For example, the image processor may find, for each section, a camera motion direction indicating the direction in which camera motion is expressed in that section. Camera motion may be expressed in different directions in different sections of the frame 4, for example, as illustrated above with respect to FIGS. 1 and 2. The image processor may find the camera motion direction for a section in any suitable manner. For example, the image processor may take a plane that is at or approximates the location of a section. The camera motion direction for a section, then, may be a vector projection of the camera motion found at 326 onto the plane. For example, the camera motion may be represented by a vector in three dimensions (e.g., arrow 18 from FIG. 1). Projecting the vector onto the plane may comprise finding the constituent components of the vector that appear in the plane. Referring to FIG. 1, the panoramic frame 4 and the various sections 6 may represent curved surfaces. The plane approximating the location of a section 6, then, may be tangent to the curve of the section, for example, at the center of the section 6. From the camera motion direction, the image processor may find a motion kernel, which may be an estimation of the point spread function at the section 6. The motion kernel may be a matrix or other filter representing the point spread function.

Figure 8:
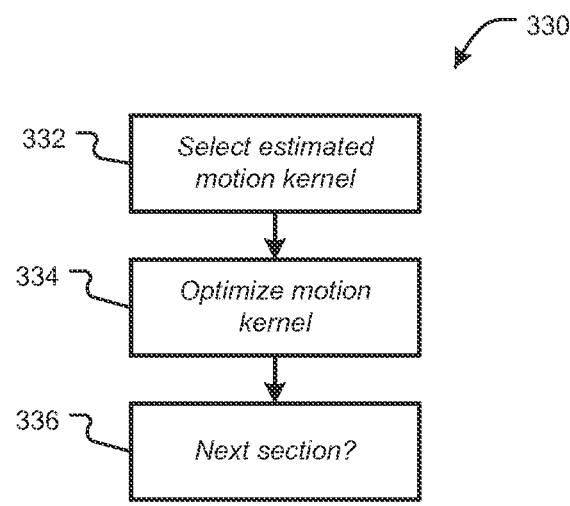
FIG. 8 is a flow chart showing one example of a process flow that may be executed by the image processor to find motion kernels for sections utilizing properties of the sections.

FIG. 8 is a flow chart showing one example of a process flow 330 that may be executed by the image processor to find motion kernels for sections utilizing properties of the sections. For example, the process flow 330 may be utilized when motion sensor readings at the camera 2 are not available. Also, in some examples, the process flow 330 may be utilized in conjunction with the process flow 320. For example, a motion kernel for one or more sections determined according to the process flow 320 may be averaged or otherwise aggregated with a motion kernel for the one or more sections.

At 332, the image processor may estimate a motion kernel for a section. The image processor may estimate the motion kernel in any suitable manner. For example, the image processor may randomly select a motion kernel for the section. In some examples, the image processor may estimate the motion kernel considering an expected point spread function for the section. For example, the image processor may estimate the motion kernel for a section to be equal to the motion kernel for a corresponding section of another frame prior to or after the subject frame in a sequence of a panoramic video including the frames. If the section is not the first section of a frame to be considered, the image processor may estimate the motion kernel considering a motion kernel previously found for an adjacent section of the frame. At 334, the image processor may refine the estimated motion kernel, for example, as described herein below with respect to action 344 of FIG. 9 described below. At 336, the image processor may, if there are additional sections, repeat 332 and 334 for each additional section.

Figure 9:
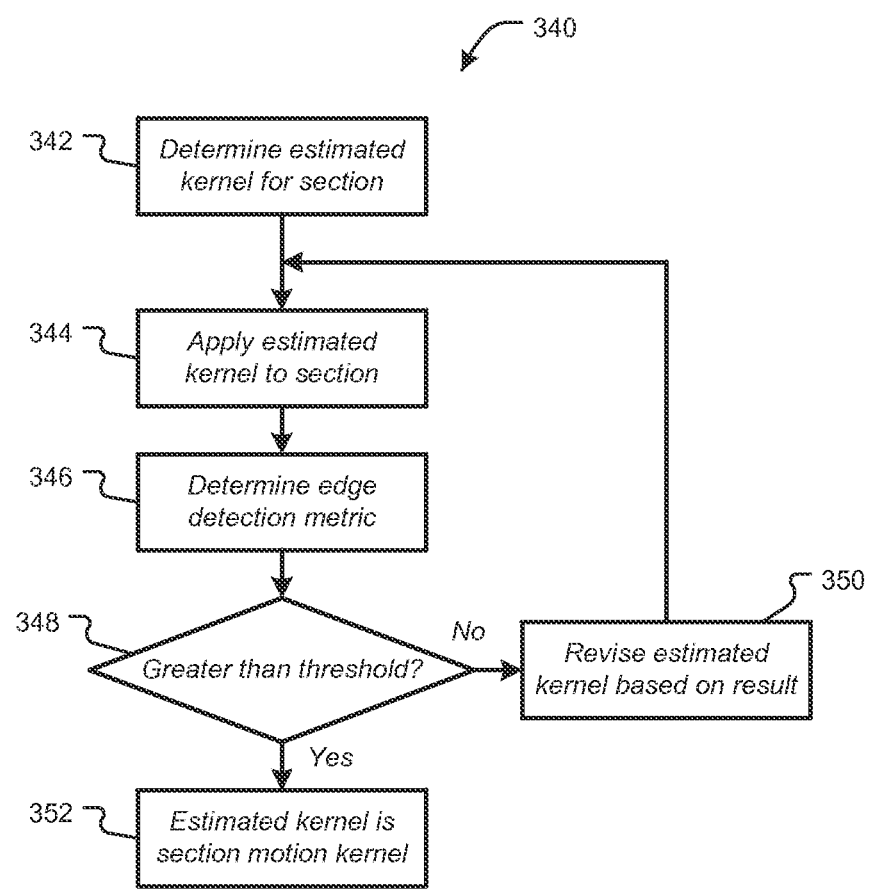
FIG. 9 is a flowchart showing one example of a process flow that may be executed by the image processor to refine an estimated motion kernel for a section.

FIG. 9 is a flowchart showing one example of a process flow 340 that may be executed by the image processor to refine an estimated motion kernel for a section. At 342, the image processor may determine an estimated kernel for a section (e.g., any of the sections of a frame). The estimated motion kernel may be found in any suitable manner. For example, the estimated motion kernel may be found based on a motion sensor reading, as described herein with respect to FIG. 7. Also, in some examples, the estimated motion kernel may be found based on a motion metric extracted from the section, as described herein with respect to FIG. 8.

At 344, the image processor may apply the estimated motion kernel to the section, resulting in a modified section (e.g., modified values for the pixel values included in the section). At 346, the image processor may find an edge detection metric for the modified section. The edge detection metric may be any metric describing the sharpness of edges in the section. For example, sharp edges in a section may be an indication of good de-blurring. Example edge detection metrics may be found, for example, by applying to the modified section an edge detection algorithm such as, for example, a Canny edge detector, a differential edge detector, etc. At 348, the image processor may determine whether the edge detection metric for the modified section indicates that the correct motion kernel has been found. This may occur, for example, when the edge detection metric exceeds a threshold value. It also may occur, for example, when the edge detection metric fails to rise for a predetermined number of iterations. For example, this may indicate that the edge detection metric has converged and may not be increased further. If the edge detection metric is greater than the threshold, then the image processor may, at 352, use the estimated kernel as the section-specific kernel for the section. Alternatively and equivalently, the image processor may use the modified section as the de-blurred section. If the edge detection metric is not greater than the threshold, then the image processor may revise the estimated kernel at 350 and repeat actions 344, 346 and 348 with the revised estimated test kernel. The process flow 340, in some examples, may be repeated for each section in a frame.

Figure 10B:
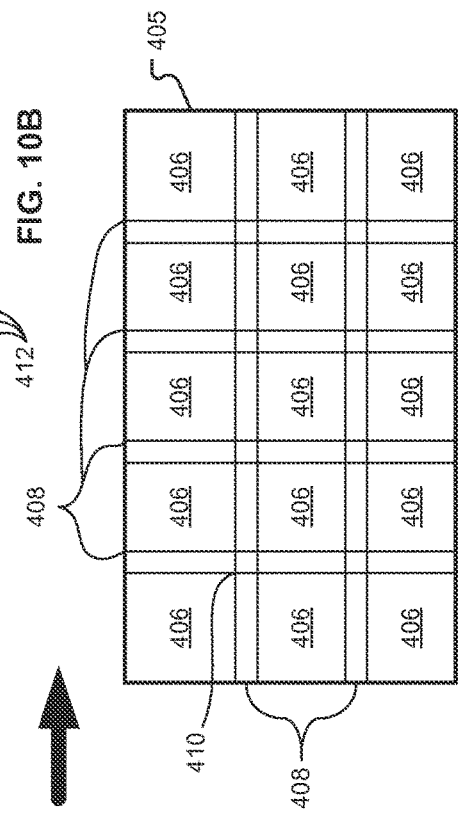
FIG. 10B is a diagram showing one example of a frame captured by the panoramic camera 402 illustrating one example way to divide the frame into sections.
Figure 10C:
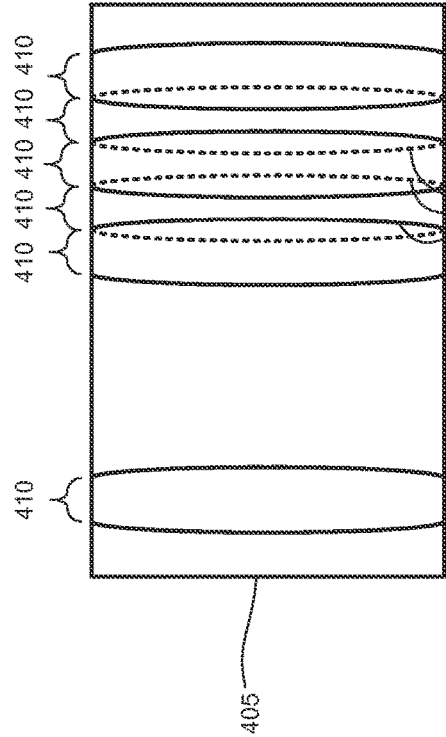
FIG. 10C is a diagram showing another example of the frame of FIG. 10B illustrating another example way to divide the frame into sections.
Figure 10A:
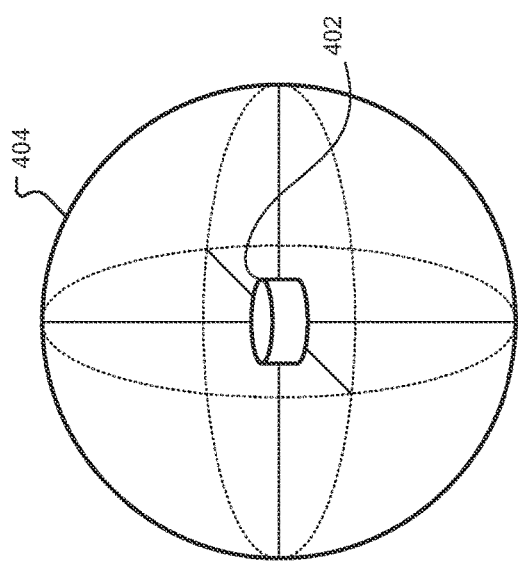
FIG. 10A is a diagram showing a spherical field-of-view around a panoramic camera.

The examples shown in FIGS. 1 and 2, sections 6 are columns selected from the frame 4. In some examples, however, the de-blurring described herein may be performed on a frame having a spherical field-of-view. A spherical field of view may be a field-of-view that extends towards the z-axis as illustrated in FIGS. 1, 5 and 10. In some examples, a full spherical field-of-view may be a full 4π steradians. In these and other examples, sections within a frame may be determined in an alternate manner. For example, FIG. 10A is a diagram showing a spherical field-of-view 404 around a panoramic camera 402. FIG. 10B is a diagram showing one example of a frame 405 captured by the panoramic camera 402 illustrating one example way to divide the frame 405 into sections 410. The frame 405 is divided into curved sections 410. For example, curved sections 410 may facilitate the mapping of the spherical field-of-view 404 onto the flat frame 405. Curved sections 410 may have curved overlap regions 412, as shown. FIG. 10C is a diagram showing another example of the frame 405 illustrating another example way to divide the frame 405 into sections 406. Sections 406 are square with straight edges, although curved edges may be used as well. Sections 406 partially overlap at overlap regions 408.

Figure 11:
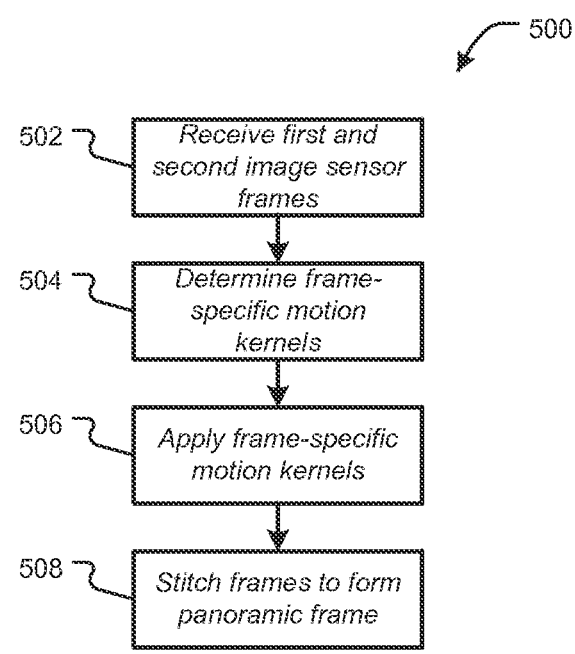
FIG. 11 is a flow chart showing one example of a process flow that may be executed by the image processor to de-blur image sensor frames prior to stitching.

As described herein, some panoramic cameras, such as the panoramic camera 2 illustrated in FIG. 5, comprise multiple image sensors, where each image sensor captures an image sensor frame and the image sensor frames are stitched into a panoramic frame. In some examples, de-blurring, as described herein, may be applied to image sensor frames prior to stitching. FIG. 11 is a flow chart showing one example of a process flow 500 that may be executed by the image processor to de-blur image sensor frames prior to stitching. At 502, the image processor may receive first and second image sensor frames. Although two frames are described in the process flow 500, any suitable number of frames may be received and stitched as described in FIG. 11 including, for example, four frames. At 504, the image processor may determine frame-specific motion kernels. Frame-specific motion kernels may be selected to match the motion of the camera expressed at the different frames. For example, each frame may be considered a section and the motion kernels may be found as described herein with respect to FIGS. 7-9. At 506, the image processor may apply each frame-specific motion kernel to its respective frame, resulting in first and second de-blurred image sensor frames. The de-blurred image sensor frames may be stitched to form a panoramic frame, at 508.

Figure 12:
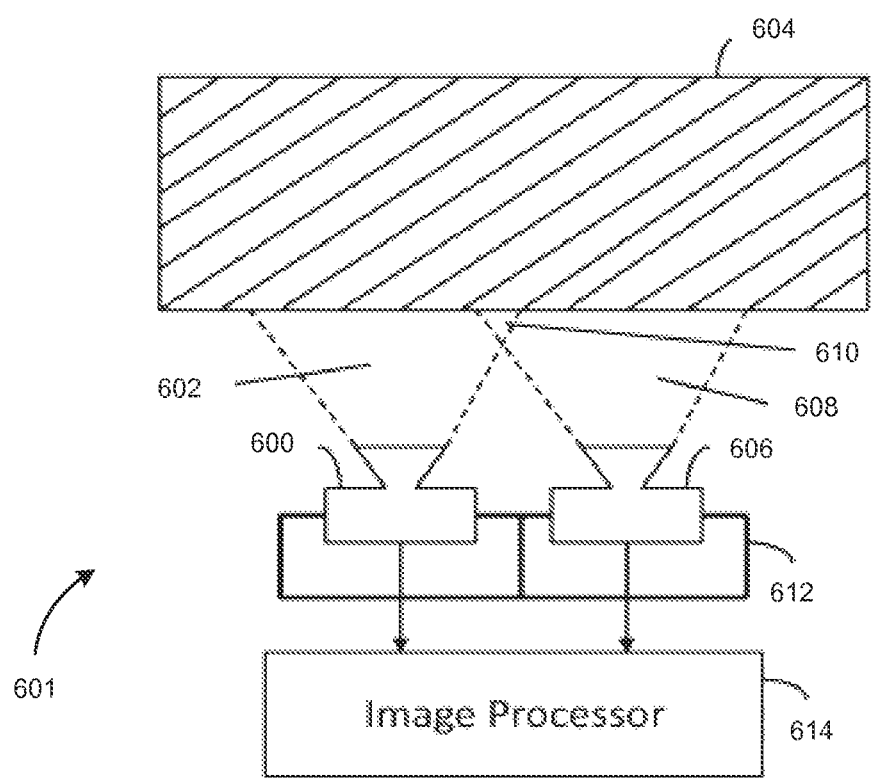
FIG. 12 is a diagram demonstrating one example of a calibration set up that may be used to stitch image sensor frames from a panoramic camera system.

The image processor may stitch image sensor frames in any suitable manner. For example, FIG. 12 is a diagram demonstrating one example of a calibration set up that may be used to stitch image sensor frames from a panoramic camera system. A panoramic camera system 601 comprises example image sensors 600, 606, a mounting assembly 612 and an image processor 614. For example, the image processor 614 may include the processing element 104 executing the stitching utility 128, described herein. Image sensor 600 has a field-of-view 602, while image sensor 606 has a field-of-view 608.

The fields-of-view 602, 608 have an overlap 610. The image sensors 600, 606 may have fixed positions on the mounting assembly 612. The image sensors 600, 606 may have fixed positions other than those shown in FIG. 12. For example, the image sensors may have the fixed positions illustrated in any of the figures herein or any other suitable position. Although two image sensors 600, 606 are shown in FIG. 12, any suitable number of image sensors may be used including, for example, four image sensors as illustrate din FIG. 5. The image sensors 600, 606 may capture image data and provide the image data to the image processor 614. The image processor 614 may be or comprise any suitable type of computing device comprising a central processor, a graphics processing unit and/or another type of processor.

The image processor 614 may be programmed to utilize frames captured by the image sensors 600, 606 to determine distortion parameters and/or alignment parameters, such as the overlap 610. For example, the image sensors 600, 606 may capture calibration frames showing a standardized calibration fixture 604 from the first and second image sensors 600, 606. The calibration fixture 604 may be any object having thereon a test pattern that allows the image processor 614 to determine the level of overlap 610 at the pixel level. For example, the calibration fixture 604 may comprise a block, a plate, a cylinder, etc. made from plastic, wood, metal or any other suitable material. The test pattern may be affixed to the calibration fixture 604 in any suitable manner. For example, the test pattern may be painted, printed, etc. In some examples, the test pattern may be printed on a decal that is bonded to the calibration fixture. In addition, the calibration fixture 604 may enable the image processor 614 to accommodate any vertical, horizontal, or rotational misalignment of the image sensors 600, 606 as well as any focus errors or areas of soft focus for each image sensor 600, 606 so that the image correction processing can be applied.

In various examples, the test pattern of the calibration fixture 604 includes straight lines. For example, the test pattern may comprise a set of diagonal lines, as illustrated in FIG. 12, or may be in the form of a grid. The image processor 614 may review frames showing the test pattern captured by various image sensors 600, 606. In various examples, the field-of-view 602, 608 of one or both of the image sensors 600, 606 may have areas of distortion, for example, due to a lens in the optical system (e.g., a lens associated with the image sensor 600, 606 and/or the curved outer surface of an enclosure described herein), or due to some other irregularity in the system. To produce an output image and/or video stream from both image sensors 600, 606, it may be desirable to minimize or eliminate non-uniform distortion, for example, along the edges where input streams are joined. For example, frames of the calibration fixture 604 captured by the image sensors 600, 606 may be analyzed by the image processor 614 to generate an indication of distortions for points in an image plane corresponding to teach of the image sensors 600, 606. The image processor may derive distortion parameters for the various image sensors 600, 606, for example, by observing the curvature of the straight lines of the test pattern as depicted in the frames. For example, distortion parameters may correct for curvature in the straight lines of the test pattern as depicted in frames from the image sensors 600, 606. The image processor 614 may apply corrections to the distortions in order to generate stitched images and/or video with minimal distortions between image sensor feeds.

The test pattern of the calibration fixture 604 may, in some examples, comprise a color chart and/or uniform gray chart. For example, these charts may allow the image processor 614 to analyze potential differences in color accuracy, relative illumination, and relative uniformity between image sensors 600, 606. Differences may be stored as correction factors and may be utilized by the image processor 614 in the stitching process to reduce noticeable differences between image streams. The calibration process may allow for a stitched frame to be stitched from multiple frames received from the image sensors with the viewer being unable to perceive any meaningful change in image quality through the entire stitched frame. The stitched frame may be a stand-alone image or may be part of a panoramic video.

Figure 13:
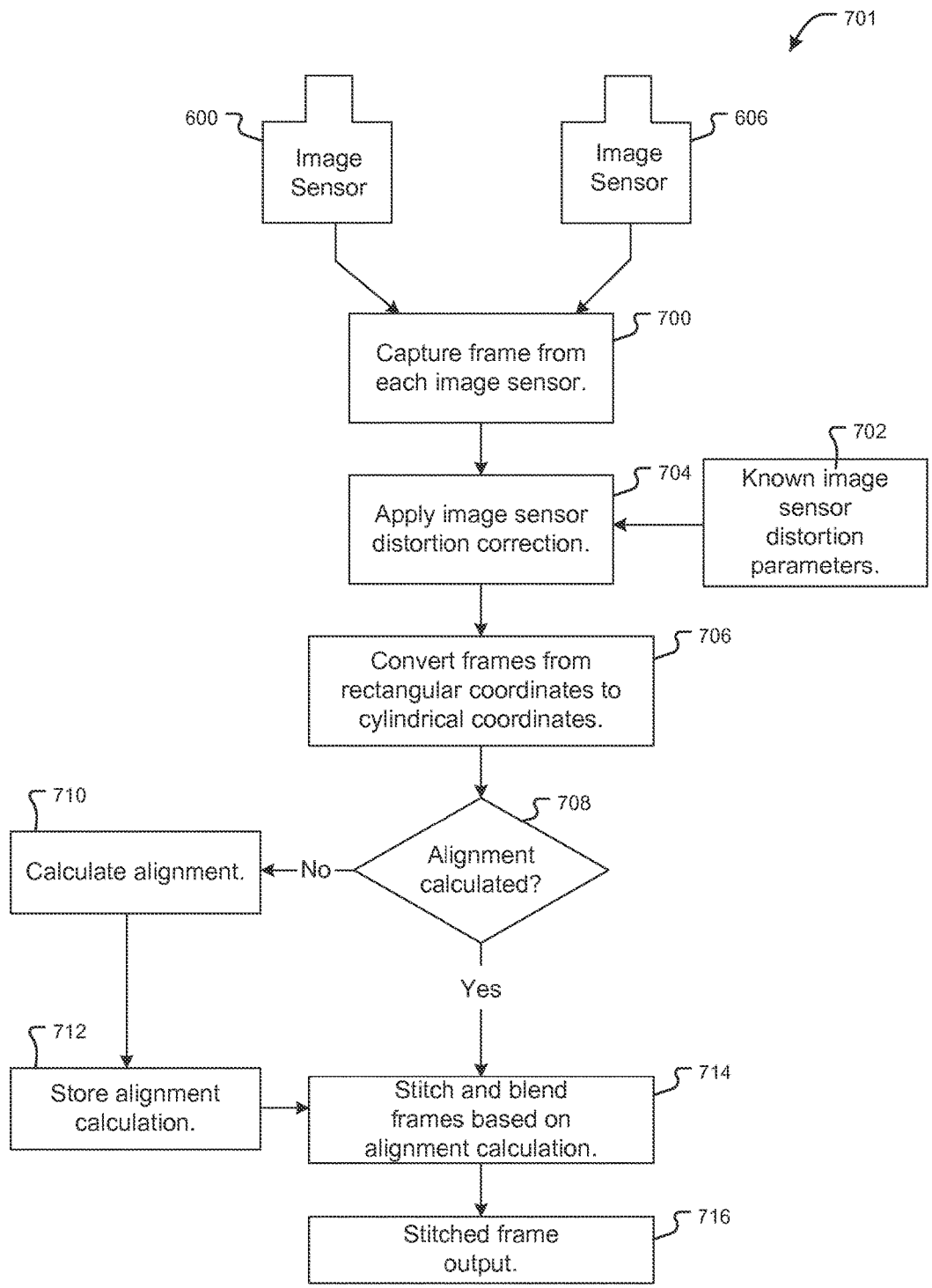
FIG. 13 is a workflow showing one example of a process for stitching frames from image sensors of a panoramic camera system.

FIG. 13 is a workflow 701 showing one example of a process for stitching frames from image sensors of a panoramic camera system. The workflow 701 is described in the context of the panoramic camera system 601 of FIG. 12, although it may be used with any of the panoramic camera systems described herein. At 700, the image processor 614 may capture frames from the image sensor 600 and the image sensor 606 (e.g., simultaneously). The frames may be still images and/or part of a video. Stored camera or image sensor distortion parameters 702 may be applied by the image processor at 704. For example, the image sensor distortion parameters may be based on frames showing the calibration fixture 604, as described herein. Optionally, at 706, the image processor 614 may convert the frames to cylindrical coordinates. For example, frames captured by the image sensors 600, 606 may be initially configured according to the lens or lenses used with the image sensors 600, 606. For example, if a fisheye lens is used, incoming frames may be arranged according to a fisheye coordinate system where each point in the frame had a viewing angle proportional to its distance from the center of the frame. Converting the frames to cylindrical coordinates may facilitate the stitching process by allowing the image processor to align the extremities of the frames.

At 708, the image processor may determine whether an alignment has been calculated. If not, an alignment between the image sensors 600, 606 may be found at 710 and stored at 712. The image processor 614 may proceed to 714. If an alignment between the image sensors 600, 606 has already been found at 708, the image processor 614 may also proceed to 714 where it may stitch the frames, blending the images based on the stored alignment calculation. Stitching at 714 may be performed in any suitable manner. In some examples, the image processor 614 may apply an alpha blending method. According to an alpha blending method, the image processor 614 may average redundant pixel values from adjacent frames. Different stitching algorithms may provide best results with different levels of overlap between adjacent frames, as described herein. The result of the stitching at 714 may be a stitched frame, output at 716. The stitched frame may be a stand-alone image or part of a video. Although the workflow 701 is described with respect to two image sensors 600, 606, it may be used to stitch any suitable number of frames from any suitable number of image sensors.

Camera distortion and alignment parameters used in the workflow 701 may be found utilizing a calibration process, for example, as described above with respect to FIG. 12. Example image sensor distortion parameters include a lens distortion parameter and a image sensor field-of-view (FOV) parameter, which may be found for each image sensor of a panoramic camera system. Example alignment parameters include offsets between each image sensor that may be used to determine the overlap between the images generated by the image sensors (e.g., 610 in FIG. 12).

Figure 14:
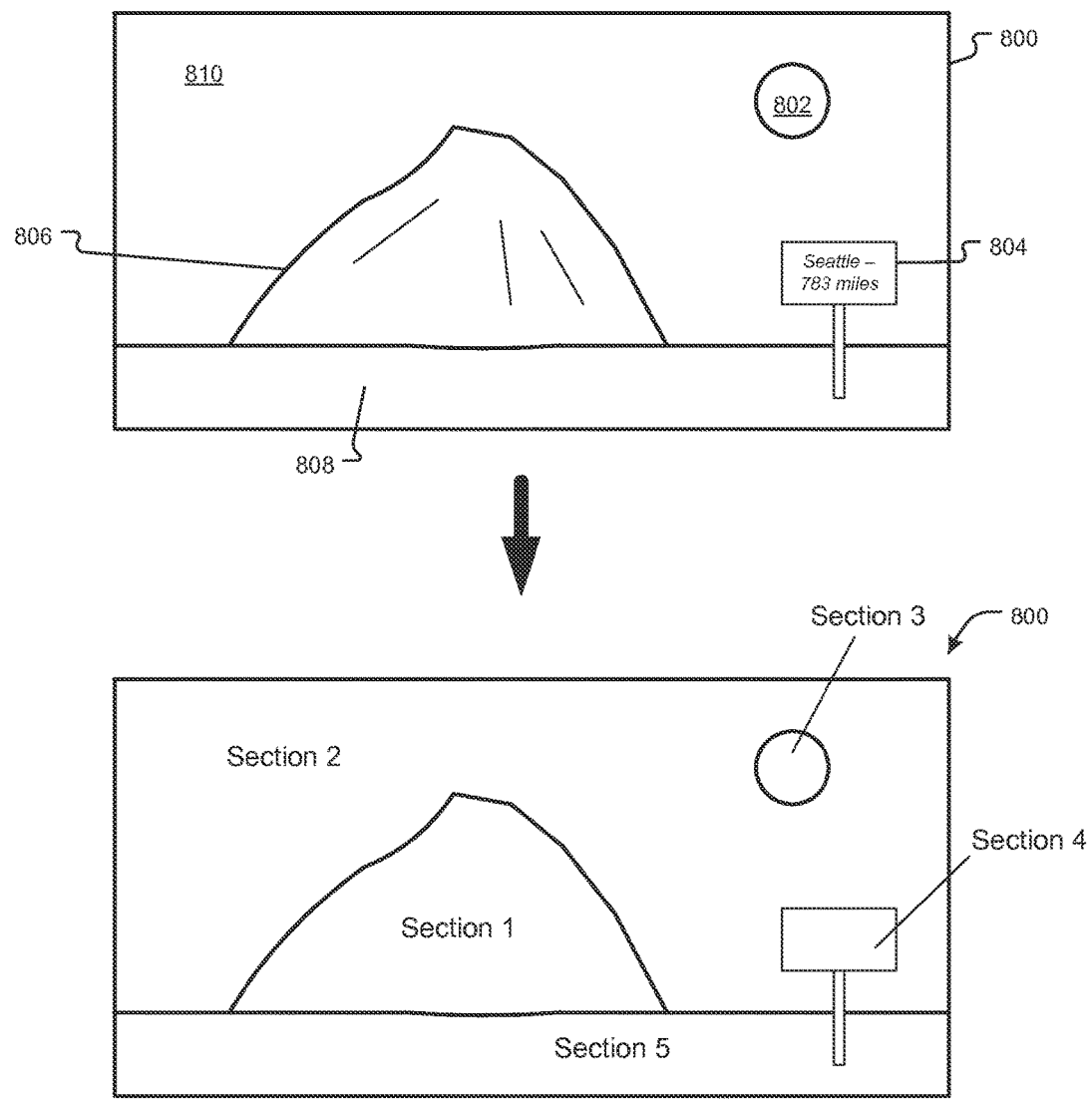
FIG. 14 is a diagram showing one example of a frame demonstrating how the frame may be divided into object-based sections.

In some examples, a frame may be divided into sections for de-blurring based on objects depicted in the frame. For example, FIG. 14 is a diagram showing one example of a panoramic frame 800 demonstrating how the panoramic frame 800 may be divided into object-based sections. The frame 800 shows an example scene including the sun 802, a mountain 806, a sign 804, ground 808 and sky 810. An image processor may divide the frame 800 into sections as shown below. Any suitable method may be used to divide the frame 800 into sections. For example, the image processor may apply an edge recognition algorithm. Sections may be placed within the detected edges. Example sections are shown in the lower portion of FIG. 14. For example, a Section 1 may include the mountain 806. A Section 2 may include the sky 810. A Section 3 may include the sun 802. A Section 4 may include the sign 804 and a Section 5 may include the ground 808. The image processor may find and apply section specific motion kernels for the various Sections 1-5, for example, as described herein with respect to FIGS. 7-9.

Figure 15:
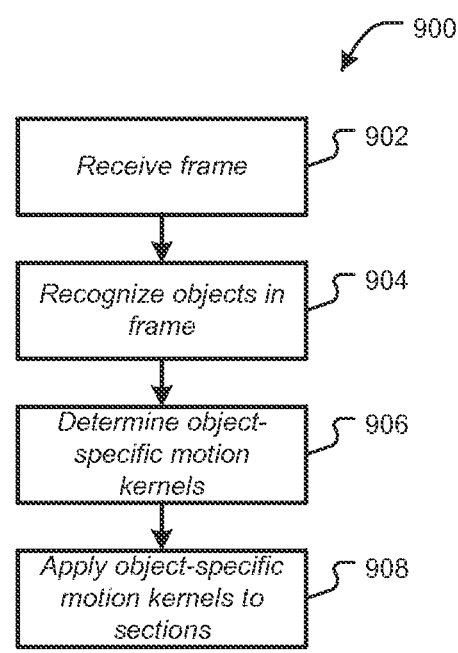
FIG. 15 is a flowchart showing one example of a process flow that may be executed by an image processor to apply motion de-blurring to object-based sections.

FIG. 15 is a flowchart showing one example of a process flow 900 that may be executed by an image processor to apply motion de-blurring to object-based sections. At 902, the image processor may receive a frame, such as a panoramic frame. At 904, the image processor may recognize one or more objects in the frame. Example objects in a frame include the mountain 806, the ground 808, the sign 804 and the sky 810 of the example frame 800 described above. The image processor may identify the objects in any suitable manner. For example, the image processor may apply an edge detection algorithm to find edges in the frame 800. Pixel values bounded by a set of edges may be considered a section. In some examples, the image processor may be programmed to apply other object-recognition techniques such as, for example, classifier-based techniques, etc. to identify objects and then corresponding sections.

At 906, the image processor may determine object-specific motion kernels for each object section identified in the frame. Object-specific motion kernels may be determined as described herein with respect to section-specific motion kernels. For example, the image processor may find the motion of a capturing image sensor or sensors relative to an object depicted in the frame. An object-specific motion kernel may be found, as described herein, based on the motion. At 908, the image processor may apply the object-specific motion kernels to the identified objects, resulting in a de-blurred frame.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A panoramic camera system, comprising:
   a panoramic camera comprising:
      a gyroscope sensor;
      a first image sensor directed in a first direction and having a first field-of-view; and
      a second image sensor directed in a second direction and having a second field-of-view; and
   an image processor comprising at least one processor and associated memory, wherein the image processor is programmed to:
      receive a first frame from the first image sensor, wherein the first frame comprises a first plurality of pixel values captured by pixel elements of the first image sensor;
      receive a second frame from the second image sensor, wherein the second frame comprises a second plurality of pixel values captured by pixel elements of the second image sensor;
      stitch the first frame and the second frame to form a panoramic frame, the panoramic frame comprising a plurality of pixel values arranged according to a two-dimensional grid;
      receive velocity vector data describing a velocity of the of the panoramic camera, the velocity vector data comprising an x velocity component describing velocity of the panoramic camera along an x-axis, a y velocity component describing velocity of the panoramic camera along a y-axis, and a z velocity component describing velocity of the panoramic camera along a z-axis;
      receive, from the gyroscope sensor, rotation vector data describing a rotation of the panoramic camera, the rotation vector data comprising an x-axis rotation component describing rotation of the panoramic camera about the x-axis, a y-axis rotation component describing rotation of the panoramic camera about the y-axis, and a z-axis rotation component describing rotation of the panoramic camera about the z-axis;
      generate a first frame section that comprises a first portion of the panoramic frame received from the first image sensor;
      generate a second frame section that comprises a second portion of the panoramic frame received from the second image sensor;
      determine a first vector projection of the velocity vector data and the rotation vector data onto the first frame section;
      determine a second vector projection of the velocity vector data and rotation vector data onto the second frame section;
      determine a first motion kernel based on the first vector projection, wherein the first motion kernel comprises a first matrix of pixel multipliers;
      apply the first motion kernel to the first frame section by convolving the first matrix with the first frame section;
      determine a second motion kernel based on the second vector projection, wherein the second motion kernel comprises a second matrix of pixel multipliers; and
      apply the second motion kernel to the second frame section by convolving the second matrix with the first frame section.

2. The panoramic camera system of claim 1, wherein determining the first motion kernel comprises:
   determining a first estimated kernel comprising a first estimated kernel matrix of pixel multipliers;
   applying the first estimated kernel to the first frame section by convolving the first estimated kernel matrix with the first frame section to generate a first estimated kernel first frame section;
   generating a first edge detection metric describing a first sharpness of an edge in the first estimated kernel first frame section;
   determining that the first edge detection metric is less than a threshold;
   generating a second estimated kernel from the first estimated kernel, the second estimated kernel comprising a second estimated kernel matrix of pixel multipliers;
   applying the second estimated kernel to the first frame section by convolving the second estimated kernel matrix with the first frame section to generate a second estimated kernel first frame section;
   generating a second edge detection metric describing a second sharpness of the edge in the second estimated kernel first frame section;
   determining that the second edge detection metric is greater than the threshold; and
   returning the second estimated kernel as the first motion kernel.

3. The panoramic camera system of claim 1, wherein the first frame section partially overlaps the second frame section at an overlap region, and wherein applying the first motion kernel to the first frame section comprises applying the first motion kernel to a first pixel value in the overlap region resulting in a first motion kernel value for the first pixel value, and wherein applying the second motion kernel to the second frame section comprises applying the second motion kernel to the first pixel value in the overlap region resulting in a second motion kernel value for the first pixel value, and wherein the image processor is further programmed to set the first pixel value to an average of the first motion kernel value for the first pixel value and the second motion kernel value for the first pixel value.

4. A system for image processing, the system comprising:
an image processor comprising at least one processor and associated memory, wherein the image processor is programmed to:
receive a frame captured by a camera, the frame comprising a plurality of pixel values arranged according to a two-dimensional grid;
select from the frame a first frame section;
select from the frame a second frame section;
determine a first motion kernel associated with the first frame section, wherein the first motion kernel is determined based at least in part on a first vector projection of first velocity vector data and first rotation vector data onto the first frame section;
apply the first motion kernel to the first frame section;
determine a second motion kernel associated with the second frame section, wherein the second motion kernel is determined based at least in part on a second vector projection of second velocity vector data and second rotation vector data onto the second frame section; and
apply the second motion kernel to the second frame section.

5. The system of claim 4, wherein the first frame section and the second frame section partially overlap at an overlap region comprising an overlap set of the plurality of pixel values, and wherein the image processor is further programmed to set pixel values of the overlap set based at least in part on first motion kernel values for the overlap set and second motion kernel values for the overlap set.

6. The system of claim 4, wherein determining the first motion kernel associated with the first frame section comprises:
determining a first estimated kernel;
applying the first estimated kernel to the first frame section to generate a first test section;
determining a first edge detection metric for the first test section;
determining that the first edge detection metric is less than a threshold;
modifying the first estimated kernel to generate a second estimated kernel;
applying the second estimated kernel to the first frame section to generate a second test section;
determining a second edge detection metric for the second test section; and
determining that the second edge detection metric is greater than the threshold, wherein the second estimated kernel is the first motion kernel.

7. The system of claim 4, wherein the frame is rectangular, wherein the two-dimensional grid comprises X positions and Y positions, and wherein the first frame section and the second frame section are columnar.

8. The system of claim 7, wherein the image processor is further programmed to select from the frame a third frame section, wherein the third frame section is also columnar.

9. The system of claim 4, wherein the image processor is further programmed to select from the frame a third frame section, wherein the second frame section is positioned in a first direction relative to the first frame section, and wherein the third frame section is positioned in a second direction relative to the first frame section, wherein the first direction and the second direction are perpendicular.

10. The system of claim 4, wherein the image processor is further programmed to:
receive an indication of a velocity of the camera;
select a number of sections for the frame based at least in part on the velocity; and
divide the frame into a plurality of frame sections having the number of sections, wherein the plurality of frame sections comprises the first frame section and the second frame section.

11. A method for de-blurring a first frame, the method comprising:
receiving, by an image processor, a first frame captured by a first image sensor having a first field-of-view;
receiving, by the image processor, a second frame captured by a second image sensor having a second field-of-view;
determining, by the image processor, a first motion kernel for the first frame, wherein the first motion kernel is determined based at least in part on a first vector projection of first velocity vector data and first rotation vector data onto the first frame;
applying, by the image processor, the first motion kernel to the first frame;
determining, by the image processor, a second motion kernel for the second frame, wherein the second motion kernel is determined based at least in part on a second vector projection of second velocity vector data and second rotation vector data onto the second frame;
applying, by the image processor, the second motion kernel to the second frame; and
stitching, by the image processor, the first frame and the second frame to form a panoramic frame.

12. The method of claim 11, further comprising receiving, by the image processor, an indication of a motion of a camera comprising the first image sensor and the second image sensor, and wherein the indication of the motion comprises at least one of the first velocity vector data and the second velocity vector data.

13. The method of claim 12, wherein determining the first motion kernel for the first frame comprises:
determining the first vector projection of first velocity vector data and first rotation vector data relative to the first frame.

14. The method of claim 11, wherein determining the first motion kernel for the first frame comprises:
deriving from the first frame a motion metric; and
determining the first motion kernel based at least in part on the motion metric.

15. The method of claim 11, further comprising:
selecting from the first frame a first object, wherein the first object comprises a first set of pixel values from the first frame;
selecting from the first frame a second object, wherein the second object comprises a second set of pixel values from the first frame;
determining a first object motion kernel for the first object;

applying the first object motion kernel to the first object;
determining a second object motion kernel for the second object; and
applying the second object motion kernel to the second object.

16. The method of claim 15, further comprising determining a motion of the first image sensor relative to the first object, and wherein determining the first object motion kernel is based at least in part on the motion of the first image sensor relative to the first object.

17. The method of claim 16, wherein determining the motion of the first image sensor relative to the first object comprises receiving from a motion sensor an indication of the motion of the first image sensor.

18. The method of claim 15, wherein determining the first object motion kernel for the first object comprises:
deriving from the first object a motion metric; and
determining the first object motion kernel based at least in part on the motion metric.

* * * * *